United States Patent
Chong et al.

(10) Patent No.: US 8,340,156 B2
(45) Date of Patent: Dec. 25, 2012

(54) METHODS OF SYNCHRONIZING WITH FIRST MULTIPATH COMPONENT IN ULTRA WIDEBAND RECEIVER AND ULTRA WIDEBAND RECEIVERS USING THE SAME

(75) Inventors: Dahae Chong, Suwon (KR); Seokho Yoon, Seoul (KR); Sangho Ahn, Siheung (KR); Youngpo Lee, Suwon (KR)

(73) Assignee: Sungkyunkwan University Foundation for Corporate Collaboration, Gyeonggi-Do (KR)

( * ) Notice: Subject to any disclaimer, the term of this patent is extended or adjusted under 35 U.S.C. 154(b) by 901 days.

(21) Appl. No.: 12/292,603

(22) Filed: Nov. 21, 2008

(65) Prior Publication Data

US 2010/0014560 A1 Jan. 21, 2010

(30) Foreign Application Priority Data

Jul. 21, 2008 (KR) .................. 10-2008-0070833

(51) Int. Cl.
*H04B 1/69* (2011.01)
*H04B 1/713* (2011.01)

(52) U.S. Cl. ........ 375/133; 375/134; 375/137; 375/142; 375/150

(58) Field of Classification Search .................. 375/130, 375/136, 150, 317
See application file for complete search history.

(56) References Cited

U.S. PATENT DOCUMENTS

| | | | | |
|---|---|---|---|---|
| 6,925,109 B2* | 8/2005 | Richards et al. | ............ | 375/150 |
| 7,342,972 B1* | 3/2008 | Giannakis et al. | ............ | 375/259 |
| 2003/0147480 A1* | 8/2003 | Richards et al. | ............ | 375/343 |
| 2003/0161411 A1* | 8/2003 | McCorkle et al. | ............ | 375/295 |
| 2005/0078735 A1* | 4/2005 | Baker et al. | ............ | 375/130 |
| 2006/0083319 A1* | 4/2006 | Giannakis et al. | ............ | 375/259 |

FOREIGN PATENT DOCUMENTS

KR 10-0669248 1/2007

OTHER PUBLICATIONS

Ramachandran, I. et al; "On Acquisitionof Wideband Direct-sequence Spread Spectrum Signals", IEEE Transaction Communication, vol. 5, pp. 1537-1546, Jun. 2006.*

Iyappan Ramachandran et al. "On Acquisition of Wideband Direct-Sequence Spread Spectrum Signals." IEEE Transactions on Wireless Communications, vol. 5, No. 6, Jun. 2006. pp. 1537-1546.

English language Abstract of KR 10-2006-0034582 dated Apr. 24, 2006.

* cited by examiner

*Primary Examiner* — David Ometz
*Assistant Examiner* — Qutbuddin Ghulamali
(74) *Attorney, Agent, or Firm* — Harness, Dickey & Pierce, P.L.C.

(57) ABSTRACT

A synchronization method in a Ultra Wideband (UWB) receiver includes receiving a signal through a multipath channel, and synchronizing with a first multipath component of the received signal by computing a correlation value between the received signal and a template signal of the receiver in a predetermined search range. Since multipath components received at the receiver after the first multipath component of the received signal have lower power than that of the first multipath component, the synchronization with the first multipath component of the received signal may improve the performance in processes after the synchronization process.

4 Claims, 9 Drawing Sheets

CM2 Channel model

CM3 Channel model

CM 4 Channel model

METHODS OF SYNCHRONIZING WITH FIRST MULTIPATH COMPONENT IN ULTRA WIDEBAND RECEIVER AND ULTRA WIDEBAND RECEIVERS USING THE SAME

CROSS-REFERENCE TO RELATED APPLICATION

This application claims priority to and the benefit of Korean Patent Application No. 2008-0070833, filed Jul. 21, 2008, the disclosure of which is incorporated herein by reference in its entirety.

BACKGROUND

1. Technical Field

The embodiments described herein relate to Ultra Wideband (UWB) communication, and more particularly, methods of synchronizing with a first multipath component in an UWB receiver in a multipath channel environment and UWB receivers using the same.

2. Discussion of Related Art

UWB systems can transmit and receive data in a local area without interfering with other systems by transmitting low-power signals at a high data transmission rate using short pulses and a relatively large bandwidth. A large amount of research is aimed at UWB systems applicable to a Wireless Personal Area Network (WPAN) for indoor local area communication at an ultrahigh rate.

For communication systems to operate properly, received signals must be synchronized. A synchronization rate or accuracy is an important measure for evaluating system performance.

The UWB systems are affected by a complex multipath channel. Since the UWB systems use low-power signals, it is difficult to perform synchronization. Accordingly, the synchronization is done using a long preamble. Since UWB systems have a wider search space than conventional communication systems, synchronization is time-consuming.

To address the above problems, research has aimed at shortening synchronization time using many synchronization methods. Synchronization is conventionally defined as aligning phase difference between the phase of a template signal of a receiver and the phases of multipath components of a received signal to within a given range.

As described in I. Ramachandran and S. Roy, "On Acquisition of Wideband Direct-sequence Spread Spectrum Signals," *IEEE Trans Commun*, vol. 5, no. 6, pp. 1537-1546, June 2006, a UWB system compares an absolute value of a correlation value between a template signal and a received signal with a threshold, determines that synchronization is accomplished when the absolute value is greater than the threshold, and achieves fast synchronization by applying many search methods.

SUMMARY

In a demodulation process, data are identified based on the energy of a received signal, and Bit Error Rate (BER) varies depending upon the multipath component with which synchronization is performed. When a received signal's energy increases, the BER decreases. Accordingly, synchronization with a firstly arrived, high-power multipath component improves performance after synchronization.

When synchronization is defined, in the conventional UWB system, as aligning the phase difference of the phase of a template signal and the phase of multipath components of a received signal to within a given range, all the multipath components are considered as synchronization components. The multipath components have different powers, and poor performance is exhibited in a process after the synchronization when the synchronization is performed using a low-power multipath component.

Since research has aimed only at shortening synchronization time in synchronization methods of the conventional UWB system, the performance in processes after synchronization cannot be ensured.

The present invention is directed to synchronization methods of a UWB receiver for improving performance in processes after synchronization process in multipath channel environment.

The present invention is also directed to UWB receivers for improving performance in processes after synchronization process.

In example embodiments, a synchronization method in a Ultra Wideband (UWB) receiver includes: receiving a signal through a multipath channel; and synchronizing with a first multipath component of the received signal by computing a correlation value between the received signal and a template signal of the receiver in a predetermined search range. The synchronizing with a first multipath component of the received signal by computing a correlation value between the received signal and a template signal of the receiver in the predetermined search range may include: computing the correlation value between the received signal and the template signal of the receiver in the predetermined search range; and setting a multipath component, which has substantially the same phase as that of the template signal, of the received signal as the first multipath component in the predetermined search range to synchronize with the first multipath component. The setting a multipath component, which has substantially the same phase as that of the template signal, of the received signal as the first multipath component in the predetermined search range to synchronize with the first multipath component may include: multiplying respective correlation value by corresponding channel coefficient in the predetermined search range and setting the largest value among values obtained by summing the multiplication results as the first multipath component to synchronize with the first multipath component. The channel coefficient information may be obtained by iteratively performing the synchronization and by storing the channel coefficient information at each synchronization. The synchronizing with a first multipath component of the received signal by computing a correlation value between the received signal and a template signal of the receiver in a predetermined search range may include setting the largest value among values obtained by summing absolute values of respective correlation value in the predetermined search range as the first multipath component to synchronize with the first multipath component. The channel time information may be obtained by iteratively performing the synchronization and by storing the channel time information at each synchronization.

In other example embodiments, a Ultra Wideband (UWB) receiver includes: a correlator configured to compute a correlation value between a signal received through a multipath channel and a template signal of the receiver in a predetermined search range; and a synchronization determiner configured to determine whether a synchronization with a first multipath component of the received signal has been done in the predetermined search range. The receiver performs the synchronization with the first multipath component of the received signal. The receiver may perform the synchronization with the first multipath component by setting a multipath component, which has substantially the same phase as that of the template signal, of the received signal as the first multipath component in the predetermined search range. The receiver may perform the synchronization with the first multipath component by multiplying respective correlation value by corresponding channel coefficient in the predetermined search range and setting the largest value among values obtained by summing the multiplication results as the first multipath component. The synchronization determiner may obtain channel coefficient information by iteratively performing the synchronization and by storing the channel coefficient information at each synchronization. The receiver may perform the synchronization with the first multipath component by setting the largest value among values obtained by summing absolute values of respective correlation value in the predetermined search range as the first multipath component. The synchronization determiner may obtain channel time information by iteratively performing the synchronization and by storing the channel time information at each synchronization.

BRIEF DESCRIPTION OF THE DRAWINGS

The above and other objects, features and advantages of the present invention will become more apparent to those of ordinary skill in the art by describing in detail example embodiments thereof with reference to the attached drawings, in which.

DETAILED DESCRIPTION OF EXAMPLE EMBODIMENTS

Figure 1:
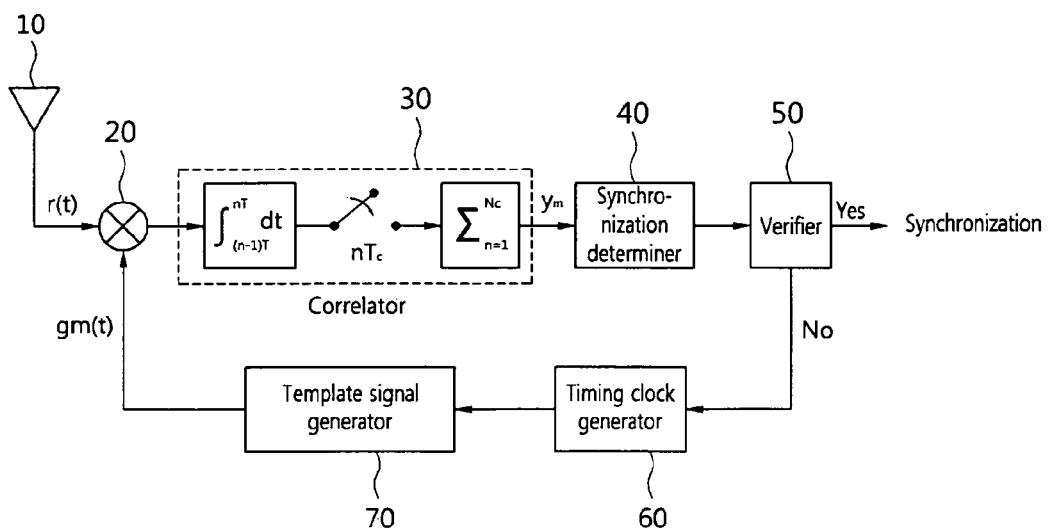
FIG. 1 is a block diagram illustrating a configuration of a UWB synchronization system according to an example embodiment of the present invention.

Hereinafter, example embodiments of the present invention will be described in detail. However, the present invention is not limited to the embodiments disclosed below, but can be implemented in various forms. The following embodiments are described in order to enable those of ordinary skill in the art to embody and practice the present invention. In the drawings, the same or similar elements are denoted by the same reference numerals.

Figure 2:
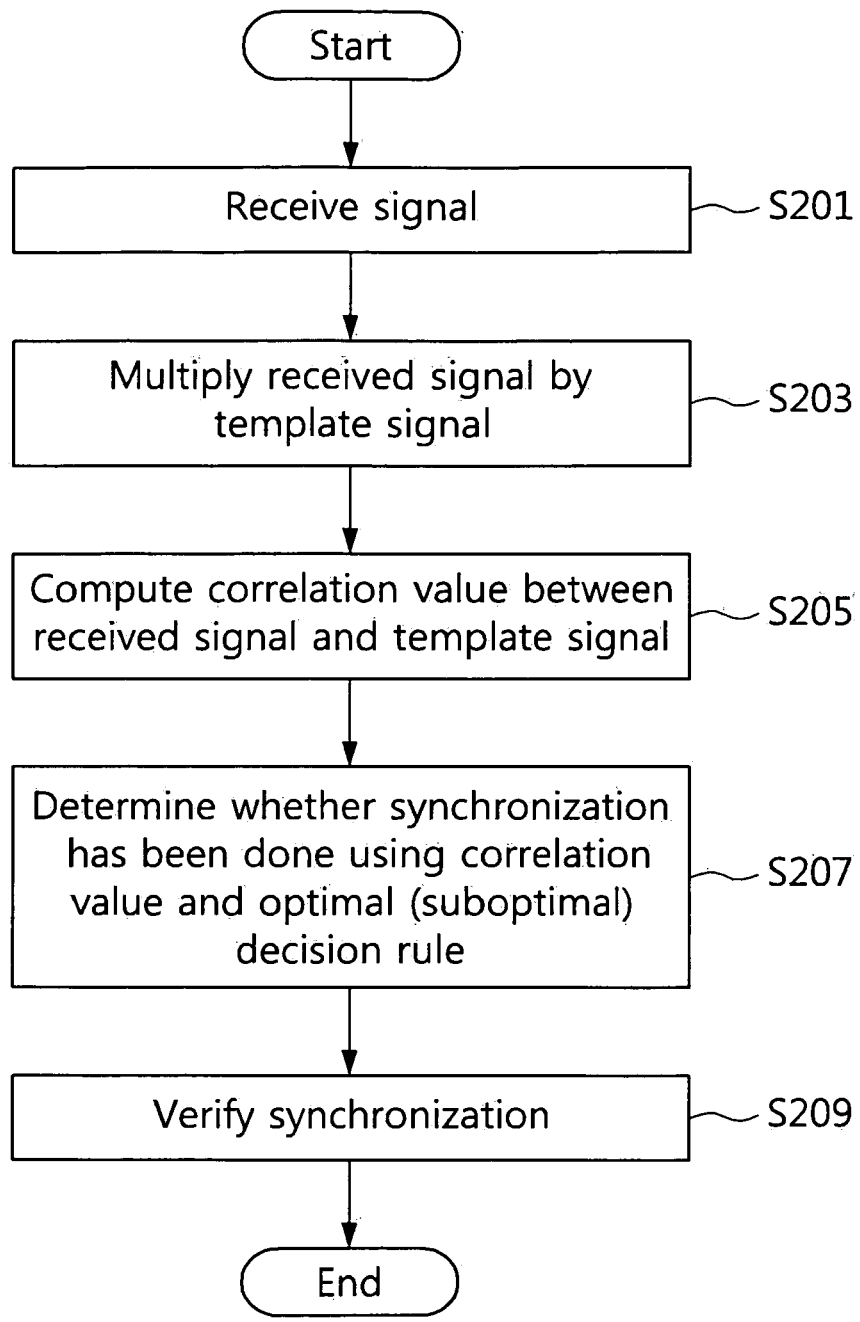
FIG. 2 is a flowchart illustrating a UWB synchronization method according to an example embodiment of the present invention.

FIG. 1 is a block diagram illustrating a configuration of a UWB synchronization system according to an example embodiment of the present invention, and FIG. 2 is a flowchart illustrating a UWB synchronization method according to an example embodiment of the present invention.

The UWB synchronization method according to an example embodiment of the present invention will be described with reference to FIGS. 1 and 2.

Referring to FIG. 1, the UWB synchronization system includes an antenna 10 for receiving a UWB signal, a multiplier 20, a correlator 30, a synchronization determiner 40, a verifier 50, a timing clock generator 60, and a template signal generator 70.

The antenna 10 receives a UWB signal through a multipath (or multipath channel) (step S201).

After the multiplier 20 multiplies the UWB signal received via the antenna 10 by a template signal (step S203), the correlator 30 computes a correlation value between the received UWB signal and the template signal (step S205).

Upon receipt of the correlation value from the correlator 30, the synchronization determiner 40 determines whether synchronization with a first multipath component of the received signal has been done using a decision rule according to an example embodiment of the present invention (step S207). According to an optimal decision rule of an example embodiment of the present invention, the synchronization may be done with the first multipath component by multiplying respective correlation value by corresponding channel coefficient in a predetermined search range and setting the largest value among values calculated by summing the multiplication results as the first multipath component. Alternatively, according to a sub-optimal decision rule of another example embodiment of the present invention, the synchronization may be done with the first multipath component by setting the largest value among values computed by summing absolute values of respective correlation value in the predetermined search range as the first multipath component. The synchronization will be described in detail later.

Upon determining that the synchronization has been done, the verifier 50 outputs a synchronized signal after verification (step S209). When the synchronization has not been done, the correlator 30 and the synchronization determiner 40 continues the synchronization, while the timing clock generator 60 and the template signal generator 70 changes the search range from a predetermined search range to the next search range, until the synchronization is completed.

An example embodiment of the present invention considers a Direct Sequence (DS)-UWB system and an IEEE 802.15.3a channel model in a signal transmission and reception process and assumes that an unmodulated data signal is transmitted during a synchronization process. Under this assumption, a transmitted signal of the DS-UWB system can be expressed as Equation 1:

$$s(t) = \sqrt{E_c} \sum_{i=1}^{N_c} c_i p(t-(i-1)T_c) \quad \text{(Equation 1)}$$

where $E_c$ represents the transmitted signal energy, $c_i \in \{1, -1\}$ represents the $i^{th}$ pseudo noise code having a period of $N_c$ chips, $T_c$ is a chip duration (or a chip time period), and p(t) represents the second derivative of a Gaussian pulse which is the most widely used signal model of the UWB system. The pulse p(t) has the duration (or time period) of $T_c$ and is expressed as Equation 2:

$$p(t) = \sqrt{\frac{4}{3t_\psi \sqrt{\pi}}} \left(1 - \left(\frac{t}{t_\psi}\right)^2\right) \exp\left(-\frac{1}{2}\left(\frac{t}{t_\psi}\right)^2\right) \quad \text{(Equation 2)}$$

where $t_\psi$ represents a parameter for adjusting the pulse duration (or the time period of a pulse).

The UWB signal received via the antenna 10 can be expressed in a form in which noise is added to a signal transmitted through a channel as shown in Equation 3:

$$r(t)=s(t)*h(t)+w(t) \quad \text{(Equation 3)}$$

where * represents a convolution operation, h(t) represents the channel impulse response, and w(t) represents Additive White Gaussian Noise (AWGN) with a power spectral density of $N_0$.

The channel impulse response h(t) uses an IEEE 802.15.3a model as shown in Equation 4 in which an indoor multipath environment is modeled:

$$h(t) = \sum_{l=1}^{L} \sum_{k=1}^{K} \alpha_{k,l} \delta(t - T_l - \tau_{k,l}) \quad \text{(Equation 4)}$$

This model includes L clusters and each cluster includes K paths. $\delta(t)$ represents the Dirac delta function, $\alpha_{k,l}$ and $\tau_{k,l}$ represent the channel coefficient and time delay of the $k^{th}$ path within the $l^{th}$ cluster, respectively, and $T_l$ represents the time delay of the $l^{th}$ cluster. $\alpha_{k,l}$ can be rewritten as a product of ±1 and a log-normal distribution variable $\beta_{k,l}$, $T_l$ and $\tau_{k,l}$ have the Poisson distributions. Distributions of the clusters and paths of the cluster are expressed as Equations 5 and 6:

$$Pr(T_{l+1}|T_l) = \Lambda \exp[-\Lambda(T_{l+1}-T_l)] \quad \text{(Equation 5)}$$

$$Pr(\tau_{k+1,l}|\tau_{k,l}) = \lambda \exp[-\lambda(\tau_{k+1,l}-\tau_{k,l})] \quad \text{(Equation 6)}$$

where $\Lambda$ represents the mean arrival rate (or mean time delay) between the clusters and $\lambda$ represents the mean arrival rate between the paths of the cluster. Channel paths have characteristics as shown in Equation 7:

$$E[\alpha_{k,l}^2] = \Omega_0 e^{-T_l/\Gamma} e^{-\tau_{k,l}/\gamma} \quad \text{(Equation 7)}$$

where $\Gamma$ and $\gamma$ represents the cluster and path decay factors, respectively, and $\Omega_0$ represents the mean power of the first path component of the first cluster.

For mathematical tractability, a time difference between paths and a single cluster channel is set to be equal to the 1-chip duration of a pseudo noise code. Accordingly, the channel model of Equation 4 can be rewritten as Equation 8:

$$h(t) = \sum_{j=1}^{L_p} \alpha_j \delta(t-(j-1)T_c - \tau) \quad \text{(Equation 8)}$$

where $L_p$(=LK) represents the number of paths, $\alpha_j$ represents the channel coefficient of the $j^{th}$ path, and $\tau$ represents the channel propagation delay. In the UWB channel, $L_p$ has a value close to infinity. However, many paths have negligibly low power. In an example embodiment, paths within 10 dB from a highest-power path are redefined as multipath components. Equation 8 can be rewritten as Equation 9:

$$h(t) = \sum_{j=1}^{Q} \alpha_j \delta(t-(j-1)T_c - \tau), \ 1 \le Q \le L_p \quad \text{(Equation 9)}$$

where Q represents the number of paths within 10 dB from the highest-power path.

The template signal generated by the template signal generator 70 is expressed as Equation 10:

$$g_m(t) = \sum_{n=1}^{N_c} c_n p(t-(n+m-1)T_c), \quad \text{(Equation 10)}$$

$$m \in \{0, 1, 2, \ldots, N_c - 1\}$$

An output value $y_m$ of the correlator 30 of FIG. 1 is expressed as Equation 11:

$$y_m = \int_0^{N_c T_c} r(t) g_m(t) dt \quad \text{(Equation 11)}$$

The output value of the correlator 30 is input to the synchronization determiner 40. The synchronization determiner 40 determines whether synchronization has been done according to the optimal or suboptimal decision rule.

In the conventional UWB system, the synchronization was defined as aligning the phase difference between the phase of a template signal and the phase of a multipath component of a received signal to within a given range, the synchronization was performed using many synchronization methods, and all multipath components are considered as synchronization components. During demodulation process, data are identified based on the energy of a received signal, and a BER may differ depending upon multipath component with which the synchronization is done. According as an amount of energy of a received signal increases in the demodulation process, the BER decreases. Accordingly, synchronization with a firstly-arrived high-power multipath component improves the performance after the synchronization process.

Figure 3:
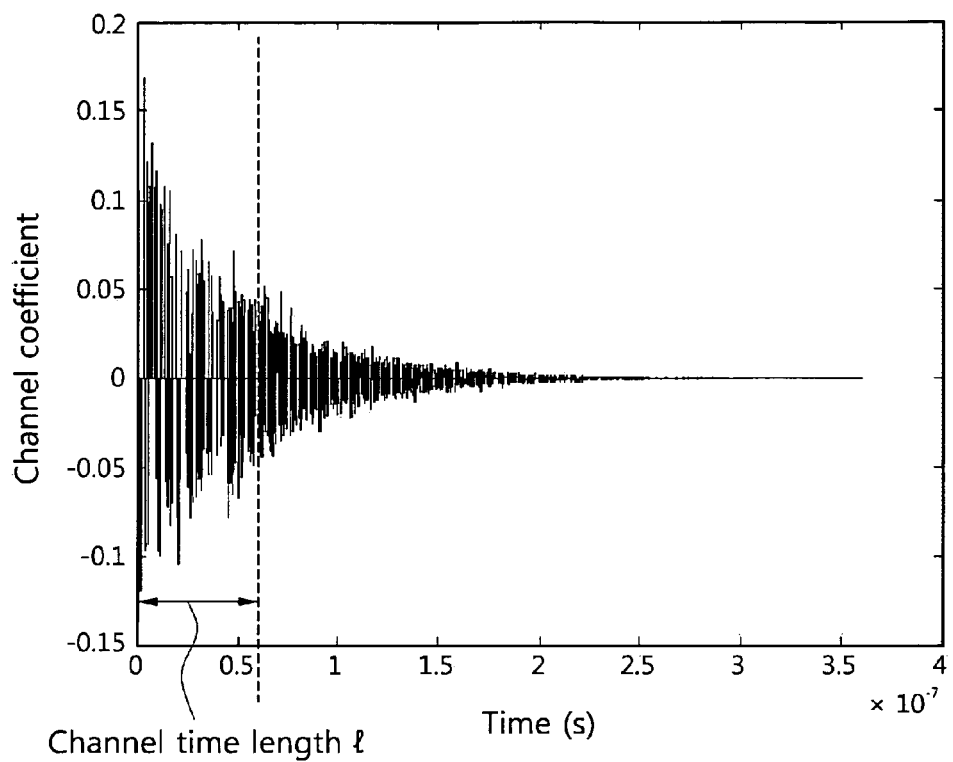
FIG. 3 is a graph illustrating an IEEE 802.15.3a multipath channel model used as a UWB communication channel model.
Figure 4:
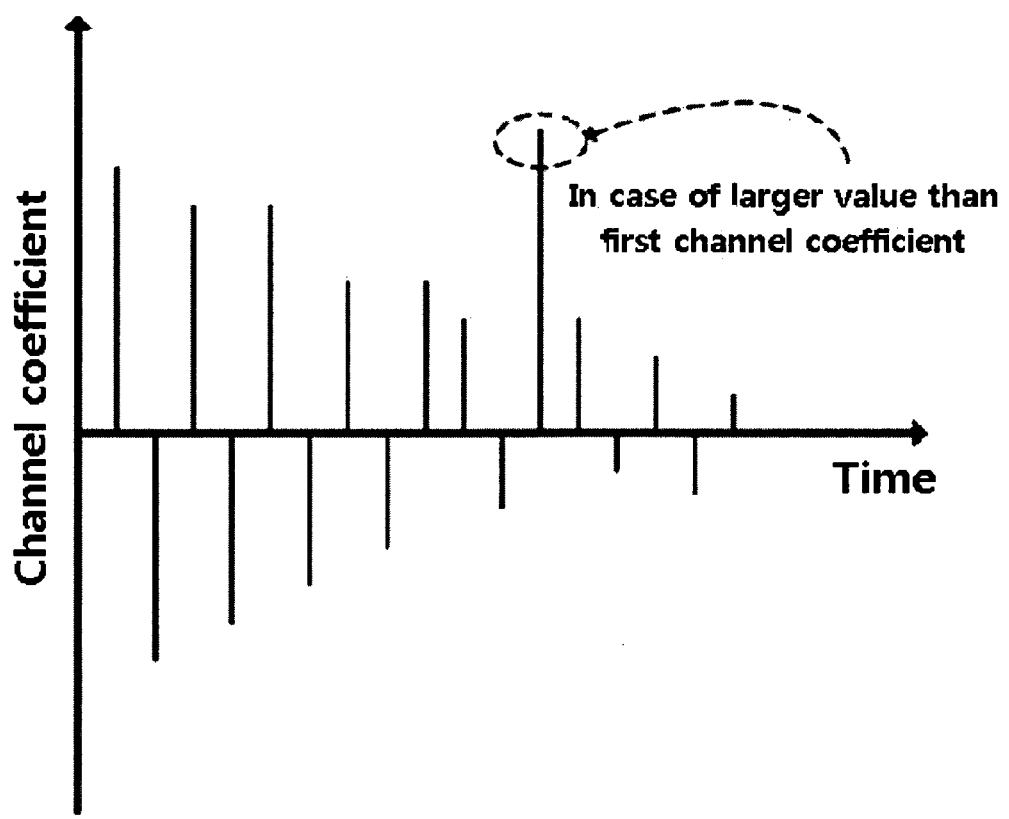
FIG. 4 is a conceptual diagram illustrating an example of a multipath channel of UWB communication.

FIG. 3 is a graph illustrating an IEEE 802.15.3a multipath channel model used as a UWB communication channel model. FIG. 4 is a conceptual diagram illustrating an example of a multipath channel of UWB communication.

As shown in FIG. 3, UWB communication channels have multiple paths. Since a channel coefficient may have both positive and negative values, a signal component passed through multipath may also have positive and negative values. Here, the number of paths having power within 10 dB from the highest-power multipath component among multipath components is denoted by Q. In FIG. 3, the number of paths included in a channel time length l corresponds to Q.

As shown in FIG. 4, the power of the channel coefficient generally decreases with time.

Since the first multipath component arrives first and generally has the highest power among multipath components as shown in Equation 7, the synchronization is newly defined such that the synchronization is done when the phase of the first multipath component coincides with the phase of the template signal of the UWB receiver according to an example embodiment of the present invention.

Table 1 shows factors depending upon the Line Of Sight (LOS) and the distance between a transmitter and a receiver in the IEEE 802.15.3a channel model.

TABLE 1

| Channel Model | $\Lambda$ (1/ns) | $\lambda$ (1/ns) | $\Gamma$ | $\gamma$ |
|---|---|---|---|---|
| CM1 LOS, 0-4 m | 0.0233 | 2.5 | 7.1 | 4.3 |
| CM2 NLOS, 0-4 m | 0.4 | 0.5 | 5.5 | 6.7 |
| CM3 NLOS, 4-10 m | 0.0667 | 2.1 | 14 | 7.9 |
| CM4 Extreme NLOS, 0-4 m | 0.0667 | 2.1 | 24 | 12 |

The conventional synchronization method determines whether the synchronization has been done by comparing $|y_m|$ with a threshold. When the synchronization is performed using the conventional synchronization method, it is determined that the synchronization has been done when $|y_m|$ is greater than the threshold. Since all search ranges may not be fully searched depending upon used synchronization method, the conventional synchronization method is not suitable for the new synchronization definition in which the synchronization is done with the first multipath component. In a synchronization method described in I. Ramachandran and S. Roy, "On Acquisition of Wideband Direct-Sequence Spread Spectrum Signals," in *IEEE Trans Commun*, vol. 5, no. 6, pp. 1537-1546, June 2006, an absolute value of a correlation value between a template signal and a received signal is compared with a threshold and it is determined that synchronization has been done when the absolute value is greater than the threshold. This synchronization method can be expressed as shown in Equation 12 suitably for the new synchronization definition according to an example embodiment of the present invention:

$$\Lambda_c(m) = \arg\max_{0 \leq m \leq N_c - 1} |y_m| \quad \text{(Equation 12)}$$

Equation 12 represents a conventional decision rule based on verified statistics in the synchronization method of I. Ramachandran and S. Roy. In the above rule, it is determined whether the largest $|y_m|$ value corresponds to the first multipath component or not. Since the first multipath component does not always has the highest power but has the highest power in average, the conventional decision rule is not suitable for the new synchronization definition according to the example embodiment of the present invention. Accordingly, hereinafter, the optimal decision rule, which is suitable for the new synchronization definition and the multipath channel according to example embodiments of the present invention, is derived.

(Optimal Decision Rule)

As shown in Equation 7, a firstly-arrived multipath component generally has high power in average. An optimal decision rule according to an example embodiment of the present invention will be described using a Maximum Likelihood (ML) method based on the firstly-arrived multipath component.

The mean and variance of $y_m$ are computed so as to obtain a distribution of $y_m$. Equation 11 can be rewritten as Equation 13:

$$y_m = \int_0^{N_c T_c} r(t) g_m(t) dt \quad \text{(Equation 13)}$$

$$= \sqrt{E_c} \int_0^{N_c T_c} \sum_{i=1}^{N_c} \sum_{n=1}^{N_c} \sum_{j=1}^{Q} \alpha_j c_i c_n p(t - (i + j - 2)T_c - \tau)$$

$$p(t - (n + m - 1)T_c) dt +$$

$$\int_0^{N_c T_c} w(t) \sum_{n=1}^{N_c} c_n p(t - (n + m - 1)T_c) dt$$

When $\tilde{\tau}(\tilde{\tau} = \tau - mT_c)$ is a phase difference between the received signal and the template signal, Equation 13 is rewritten as Equations 14 and 15:

$$y_m = \begin{cases} N_c \sqrt{E_c}\, \alpha_1 + w'(t), & \tilde{\tau} = 0 \\ N_c \sqrt{E_c}\, \alpha_2 + w'(t), & \tilde{\tau} = T_c \\ \vdots & \vdots \\ N_c \sqrt{E_c}\, \alpha_Q + w'(t), & \tilde{\tau} = (Q-1)T_c \\ w'(t), & \tilde{\tau} = QT_c \\ \vdots & \vdots \\ w'(t), & \tilde{\tau} = (N_c - 1)T_c \end{cases} \quad \text{(Equation 14)}$$

$$w'(t) = \int_0^{N_c T_c} w(t) \sum_{n=1}^{N_c} c_n p(t - (n + m - 1)T_c) dt \quad \text{(Equation 15)}$$

where w'(t) corresponds to a noise component included in the correlator output value and has the variance $N_c N_0$.

A probability density function of the correlator output value $y_m$ corresponding to the $j^{th}$ multipath component is expressed as shown in Equation 16:

$$f_j(y_m) = \frac{1}{\sqrt{2\pi N_c N_0}} \exp\left(-\frac{(y_m - N_c \sqrt{E_c}\, \alpha_j)^2}{2 N_c N_0}\right) \quad \text{(Equation 16)}$$

where $N_c \sqrt{E_c}\, \alpha_j$ represents the average (or mean) of the $j^{th}$ multipath component and $N_c N_0$ represents the variance of noise. A probability density function of the correlator output value $y_m$ not corresponding to any multipath component can be expressed as shown in Equation 17:

$$f_0(y_m) = \frac{1}{\sqrt{2\pi N_c N_0}} \exp\left(\frac{y_m^2}{2 N_c N_0}\right) \quad \text{(Equation 17)}$$

The output values of the correlator 30 in all search ranges are needed so as to derive the optimal decision rule based on the ML method according to an example embodiment of the present invention. The output values of the correlator 30 can be expressed as shown in Equation 18:

$$y = [y_0, y_1, \ldots, y_{N_c - 1}]^T, y_i = y_{(i \bmod N_C)} \quad \text{(Equation 18)}$$

According to the optimal decision rule of an example embodiment of the present invention, the synchronization is done with the first multipath component. Thus, the probability density function of y can be expressed as shown in Equation 19 when the first multipath component corresponds to $y_m$ (where m is a constant), that is, when $\tau=mT_c$ (in case exact synchronization is done).

$$f(y \mid m) = \prod_{b=0}^{N_C-1} f_0(y_b) \prod_{j=1}^{Q} \frac{f_j(y_{m+j-1})}{f_0(y_{m+j-1})} \quad \text{(Equation 19)}$$

When a channel transfer delay $\tau$ has a uniform probability, an ML decision rule $\Lambda_0$ is expressed as shown in Equation 20:

$$\Lambda_0(m) = \arg\max_{0 \le m \le N_c-1} f(y \mid m) \quad \text{(Equation 20)}$$

Equation 21 can be obtained by removing the terms which are independent of m from Equation 20:

$$\Lambda_0(m) = argmax_{0 \le m \le N_c-1} \prod_{j=1}^{Q} \frac{f_j(y_{m+j-1})}{f_0(y_{m+j-1})} \quad \text{(Equation 21)}$$

Equation 22 can be obtained by inserting Equations 16 and 17 into Equation 21:

$$\Lambda_0(m) = \arg\max_{0 \le m \le N_c-1} \exp\left( \sum_{j=1}^{Q} \frac{\left(y_{m+j-1} - N_c\sqrt{E_c}\,\alpha_j\right)^2}{2N_cN_0} + \frac{y_{m+j-1}^2}{2N_cN_0} \right) \quad \text{(Equation 22)}$$

According to an example embodiment of the present invention, the optimal decision rule can be expressed as Equation 23 by removing the constants and terms which are independent of m from Equation 22:

$$\Lambda_0(m) = \arg\max_{0 \le m \le N_c-1} \left( \sum_{j=1}^{Q} y_{m+j-1} \alpha_j \right) \quad \text{(Equation 23)}$$

Equation 23 shows the optimal decision rule for finding the first multipath component in a UWB channel according to an example embodiment of the present invention. In the optimal decision rule, The channel information is pre-detected for real implementation, and the channel information such as channel coefficient information $\{\alpha_j\}_{j=1}^{Q}$, is stored at each synchronization during iterative synchronization.

Along with the optimal decision rule according to an example embodiment of the present invention, hereinafter, a suboptimal decision rule for finding the first multipath component according to another example embodiment of the present invention will be described.

When the first multipath component is found ($\tau-mT_c=0$), $V(0)$ has a value as shown in Equation 24 when noise is absent in a part (•) of equation 23:

$$V(0) = N_c\sqrt{E_c}(\alpha_1^2 + \alpha_2^2 + \ldots + \alpha_Q^2) \quad \text{(Equation 24)}$$

Equation 24 can be rewritten as Equation 25:

$$V(0) = N_c\sqrt{E_c}(val_1^2 sgn_1^2 + val_2^2 sgn_2^2 + \ldots + val_Q^2 sgn_Q^2) \quad \text{(Equation 25)}$$

Here, $\{val_j\}_{j=1}^{Q}$ and $\{sgn_j\}_{j=1}^{Q}$ represent a value and a sign of $\{\alpha_j\}_{j=1}^{Q}$ respectively. $\{sgn_j\}_{j=1}^{Q}$ has a value of $\pm 1$, and accordingly Equation 25 can be rewritten as Equation 26:

$$\begin{aligned} V(0) &= N_c\sqrt{E_c}\,(val_1|val_1 sgn_1| + val_2|val_2 sgn_2| + \ldots + \\ &\quad val_Q|val_Q sgn_Q|) \\ &= N_c\sqrt{E_c}\,(val_1|\alpha_1| + val_2|\alpha_2| + \ldots + val_Q|\alpha_Q|) \\ &= \sum_{j=1}^{Q} |N_c\sqrt{E_c}\,\alpha_j| val_j \end{aligned} \quad \text{(Equation 26)}$$

The optimal decision rule shown in Equation 26 can be rewritten as Equation 27:

$$\Lambda_0(m) = \arg\max_{0 \le m \le N_c-1} \left( \sum_{j=1}^{Q} |y_{m+j-1}| val_j \right) \quad \text{(Equation 27)}$$

That is, the part (•) of equation 27 of the optimal decision rule according to an example embodiment of the present invention can be written as a product of channel coefficients and absolute values of correlation values. However, since a receiving side, i.e. a receiver, may not detect channel information without above mentioned iteration procedure, the suboptimal decision rule according to another example embodiment of the present invention can be expressed as shown in Equation 28 by omitting $\{val_j\}_{j=1}^{Q}$:

$$\Lambda_s(m) = \arg\max_{0 \le m \le N_c-1} \left( \sum_{j=1}^{Q} |y_{m+j-1}| \right) \quad \text{(Equation 28)}$$

The suboptimal decision rule shown in Equation 28 may have lower performance than the optimal decision rule, but can obtain the first multipath component without channel information. In the suboptimal decision rule, like the optimal decision rule, iterative synchronization processes are performed to correctly compute a Q value. All channel information is stored in the optimal decision rule according to an example embodiment of the present invention, but only a channel length l (see FIG. 3) is stored in the suboptimal decision rule according to another example embodiment of the present invention. Even when the Q value has a small error, it does not affect the operation and performance of the UWB system. Thus, the iterative synchronization process may be omitted.

(Simulation Results)

Figure 5:
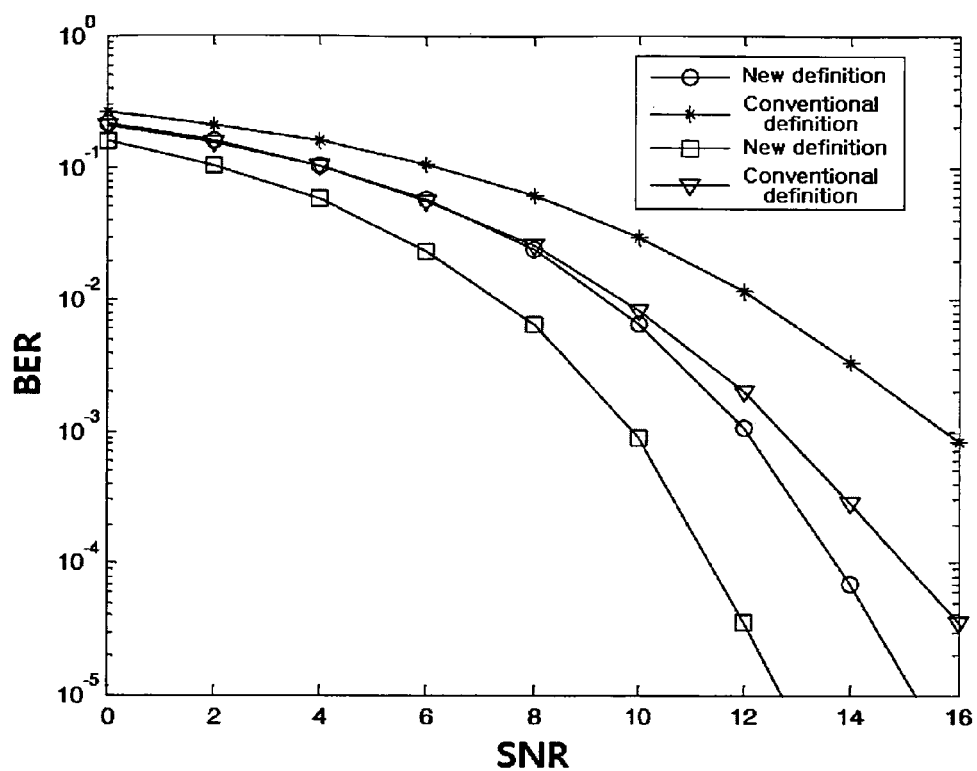
FIG. 5 is a graph illustrating BERs in a demodulation process after synchronization in cases of synchronization with a first multipath component by a UWB synchronization definition according to an example embodiment of the present invention and synchronization with one of multipath components by a conventional UWB synchronization definition.

FIG. 5 is a graph illustrating BERs in a demodulation process after synchronization in cases of synchronization with a first multipath component by a UWB synchronization definition according to an example embodiment of the present invention and synchronization with one of multipath components by a conventional UWB synchronization definition.

In an IEEE 802.15.3a standard, four channel models CM1, CM2, CM3, and CM4 are classified according to the existence of LOS (Line of Sight) and the distance between a transmitter and a receiver. Channel factors applied to the channel models are different from each other. Demodulation performance in the representative channel model CM1 among the four channel models was computed and the channel factors of Table 1 were used. Rake receivers with four and eight fingers were used to demodulate data and binary Pulse Amplitude Modulation (PAM) was used to modulate data. As shown in FIG. 5, it can be seen that synchronization with the first multipath component according to the new definition of the synchronization has better demodulation performance. Consequently, it can be seen that the synchronization according to the new definition improves performance in processes after the synchronization process.

Figure 6:
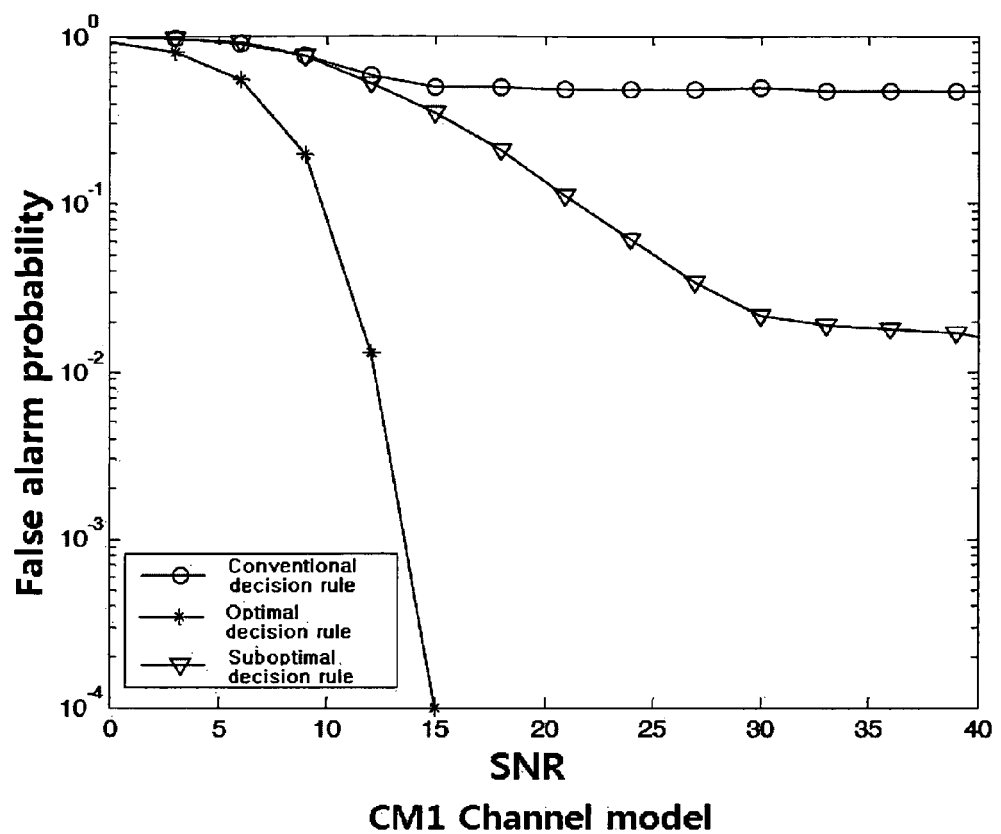
FIG. 6 is a graph illustrating false alarm probabilities of a conventional decision rule, an optimal decision rule according to an example embodiment of the present invention, and a suboptimal decision rule according to another example embodiment of the present invention in an IEEE 802.15.3a CM1 channel model.
Figure 7:
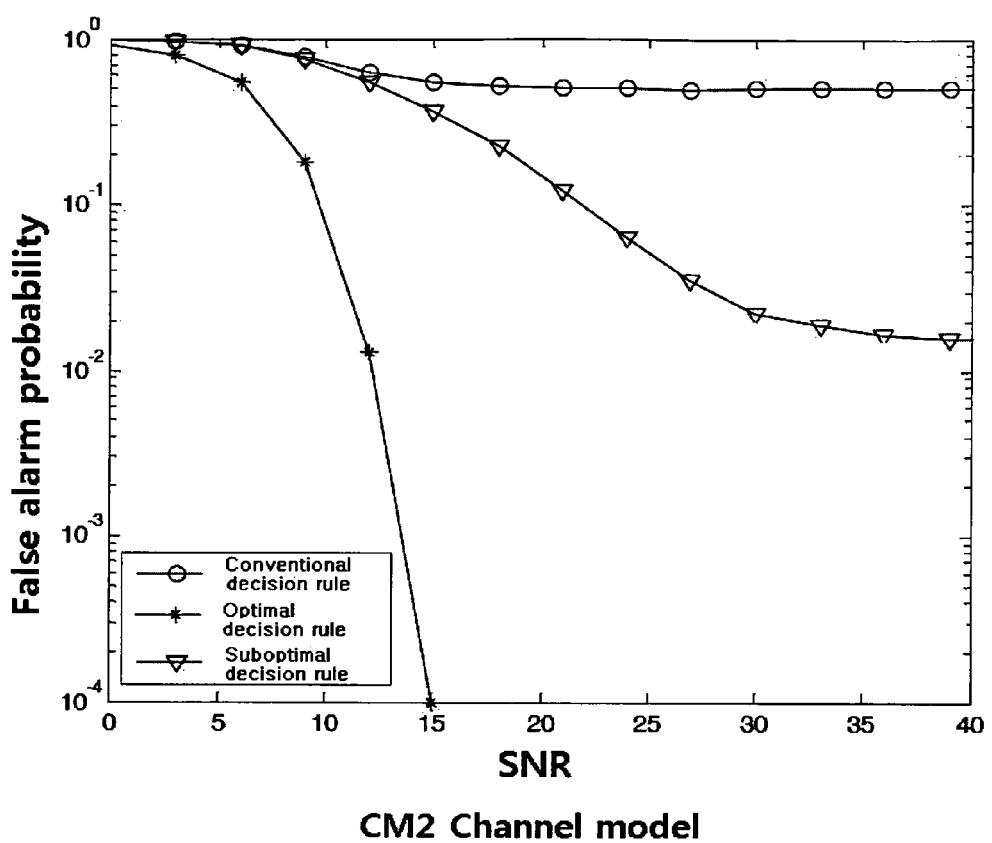
FIG. 7 is a graph illustrating false alarm probabilities of a conventional decision rule, an optimal decision rule according to an example embodiment of the present invention, and a suboptimal decision rule according to another example embodiment of the present invention in an IEEE 802.15.3a CM2 channel model.
Figure 8:
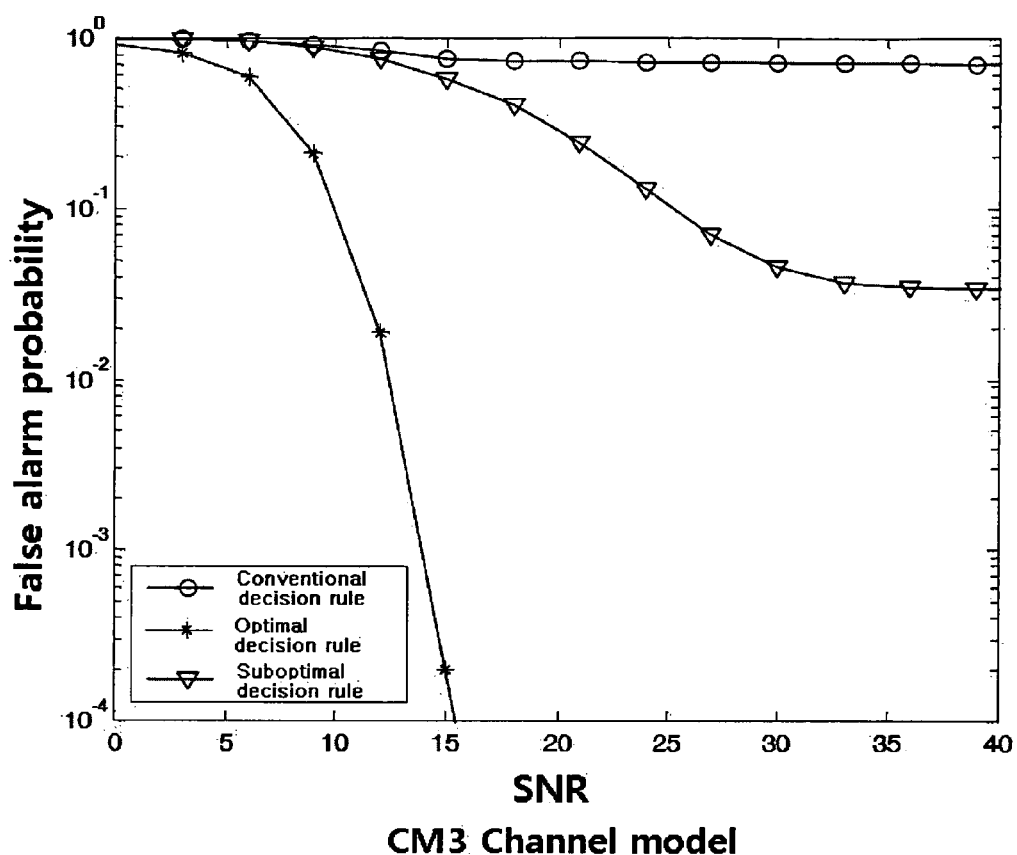
FIG. 8 is a graph illustrating false alarm probabilities of a conventional decision rule, an optimal decision rule according to an example embodiment of the present invention, and a suboptimal decision rule according to another example embodiment of the present invention in an IEEE 802.15.3a CM3 channel model.
Figure 9:
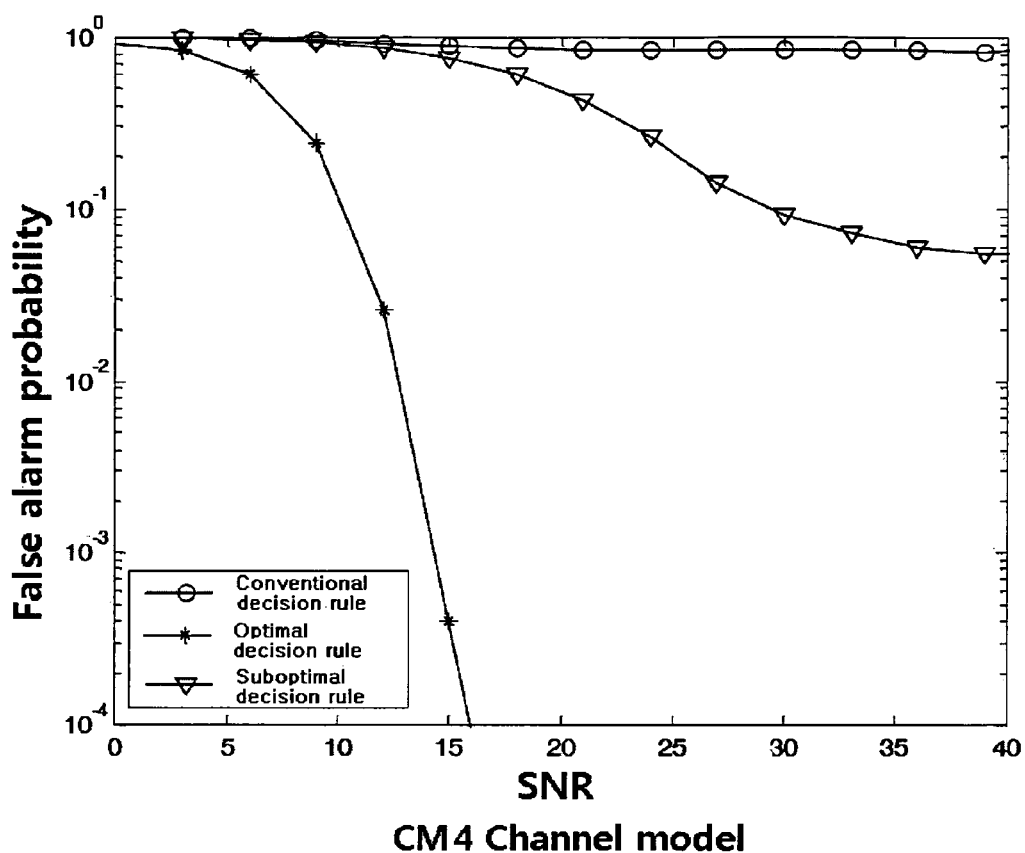
FIG. 9 is a graph illustrating false alarm probabilities of a conventional decision rule, an optimal decision rule according to an example embodiment of the present invention, and a suboptimal decision rule according to another example embodiment of the present invention in an IEEE 802.15.3a CM4 channel model.

FIG. 6 is a graph illustrating false alarm probabilities of a conventional decision rule, an optimal decision rule according to an example embodiment of the present invention, and a suboptimal decision rule according to another example embodiment of the present invention in an IEEE 802.15.3a CM1 channel model. FIG. 7 is a graph illustrating false alarm probabilities of a conventional decision rule, an optimal decision rule according to an example embodiment of the present invention, and a suboptimal decision rule according to another example embodiment of the present invention in an IEEE 802.15.3a CM2 channel model. FIG. 8 is a graph illustrating false alarm probabilities of a conventional decision rule, an optimal decision rule according to an example embodiment of the present invention, and a suboptimal decision rule according to another example embodiment of the present invention in an IEEE 802.15.3a CM3 channel model. FIG. 9 is a graph illustrating false alarm probabilities of a conventional decision rule, an optimal decision rule according to an example embodiment of the present invention, and a suboptimal decision rule according to another example embodiment of the present invention in an IEEE 802.15.3a CM4 channel model.

In FIGS. 6 through 9, false alarm probability performances based on signal to noise ratios (SNRs) of the conventional decision rule and the optimal and suboptimal decision rules according to the exemplary embodiments of the present invention are compared through simulation. The false alarm probability is the probability that a phase found by the decision rule (optimal or suboptimal decision rule) according to the example embodiment of the present invention does not correspond to the first multipath component. The SNR was defined by Ec/No, a pseudo noise code with a period of 255 chips was used, and the 1-chip duration of the pseudo noise code was set to 0.5 ns. The IEEE 802.15.3a channel models CM1, CM2, CM3, and CM4 were simulated with respect to Equation 4. The channel models CM1, CM2, CM3, and CM4 were designed using the channel factors of Table 4.

As shown in FIGS. 6 to 9, it can be seen that the optimal and suboptimal decision rules according to the example embodiments of the present invention outperform the conventional decision rule. Since the optimal decision rule according to an example embodiment of the present invention uses channel information, the best performance is exhibited. Since the suboptimal decision rule according to another example embodiment of the present invention does not use channel information, the suboptimal decision rule has lower performance than the optimal decision rule. It can be seen that both the optimal and suboptimal decision rules have slight performance degradation in the order of CM1, CM2, CM3, and CM4, that is, performance degradation increases according as channel complexity increases. It can be seen that the difference in performance between the conventional decision rule and the decision rules according to the example embodiments of the present invention increases according as the SNR increases.

According to example embodiments of the present invention, since the first multipath component of a signal received through a multipath in UWB communication arrives first and has the highest power in average, the synchronization is newly defined as the synchronization is done when the phase of a template signal of the UWB receiver is the same as the phase of the first multipath component of a received signal To improve performance in processes after the synchronization process, the example embodiments of the present invention provides optimal decision rule and suboptimal decision rule for synchronization with the first multipath component of the received signal using the maximum-likelihood method and the probability density function.

Since a multipath component received at the receiver after the first multipath component of the received signal has a lower power than the first multipath component, the synchronization with the first multipath component of the received signal may improve the performance of processes after the synchronization process.

While the invention has been shown and described with reference to certain example embodiments thereof, it will be understood by those skilled in the art that various changes in form and details may be made therein without departing from the spirit and scope of the invention as defined by the appended claims.

What is claimed is:

1. A synchronization method in a Ultra Wideband (UWB) receiver, comprising:
   receiving a signal through a multipath channel; and
   synchronizing with a first multipath component of the received signal by computing a correlation value between the received signal and a template signal of the receiver in a predetermined search range,
   wherein the synchronizing with the first multipath component of the received signal includes,
   multiplying respective correlation values by corresponding channel coefficients in the predetermined search range and setting a largest value among values obtained by summing the multiplication results as a first multipath component to synchronize with the first multipath component of the received signal, or
   setting the largest value among values obtained by summing absolute values of respective correlation values in the predetermined search range as the first multipath component to synchronize with the first multipath component of the received signal,
   wherein the corresponding channel coefficients in the predetermined search range are obtained by iteratively performing the synchronization and by storing the corresponding channel coefficients in the predetermined search range at each synchronization.

2. The synchronization method of claim 1, further comprising:
   setting a multipath component, which has substantially the same phase as that of the template signal, of the received signal as the first multipath component of the received signal in the predetermined search range to synchronize with the first multipath component.

3. A Ultra Wideband (UWB) receiver comprising:
   a correlator configured to compute a correlation value between a signal received through a multipath channel and a template signal of the receiver in a predetermined search range; and
   a synchronization determiner configured to determine whether a synchronization with a first multipath component of the received signal has been done in the predetermined search range, wherein
   the UWB receiver is configured to perform the synchronization with the first multipath component of the received signal by multiplying respective correlation values by corresponding channel coefficients in the predetermined search range and setting a largest value among values obtained by summing the multiplication results as a first multipath component, or the UWB receiver is configured to perform the synchronization with the multipath component of the received signal by setting the largest value among values obtained by summing absolute values of respective correlation values in the predetermined search range as the first multipath component, and the synchronization determiner obtains the corresponding channel coefficients in the predetermined search range by iteratively performing the synchronization and by storing the corresponding channel coefficients in the predetermined search range at each synchronization.

4. The UWB receiver of claim 3, wherein the receiver is configured to perform the synchronization with the first multipath component by setting the multipath component, which has substantially the same phase as that of the template signal, of the received signal as the first multipath component in the predetermined search range.

* * * * *

UNITED STATES PATENT AND TRADEMARK OFFICE
CERTIFICATE OF CORRECTION

| | | |
|---|---|---|
| PATENT NO. | : 8,340,156 B2 | Page 1 of 1 |
| APPLICATION NO. | : 12/292603 | |
| DATED | : December 25, 2012 | |
| INVENTOR(S) | : Chong et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 975 days.

Signed and Sealed this
Eighteenth Day of November, 2014

Michelle K. Lee
*Deputy Director of the United States Patent and Trademark Office*